(12) United States Patent
Xu et al.

(10) Patent No.: US 7,742,438 B1
(45) Date of Patent: Jun. 22, 2010

(54) HDCP DATA TRANSMISSION OVER A SINGLE COMMUNICATION CHANNEL

(75) Inventors: Mingcheng Xu, Simi Valley, CA (US); Shing-Wu Tzeng, Fountain Valley, CA (US)

(73) Assignee: OWLink Technology, Inc., Tustin, CA (US)

( * ) Notice: Subject to any disclaimer, the term of this patent is extended or adjusted under 35 U.S.C. 154(b) by 918 days.

(21) Appl. No.: 11/112,766

(22) Filed: Apr. 21, 2005

Related U.S. Application Data (60) Provisional application No. 60/621,210, filed on Oct. 21, 2004.

(51) Int. Cl.
*H04B 7/005* (2006.01)

(52) U.S. Cl. ........................ 370/278; 370/310; 370/467; 370/543

(58) Field of Classification Search ................. 370/473, 370/279
See application file for complete search history.

(56) References Cited

U.S. PATENT DOCUMENTS

| 4,599,719 A * | 7/1986 | Breen et al. ................. 370/296 |
| 2005/0071542 A1 * | 3/2005 | Weber et al. ................. 711/105 |
| 2005/0136990 A1 * | 6/2005 | Hardacker et al. .......... 455/572 |

OTHER PUBLICATIONS

Philips Semiconductor The I 2C-Bus Specification Version 2.1 Jan. 2000.*

* cited by examiner

*Primary Examiner*—Kevin C Harper
*Assistant Examiner*—Henry Baron
(74) *Attorney, Agent, or Firm*—Fenwick & West LLP (57) ABSTRACT

Implementation schemes for transmitting High-Bandwidth Digital Content (HDCP) control-related data in HDCP systems over a single communication channel.

18 Claims, 9 Drawing Sheets

Figure 3 Write Operation

Figure 4

Figure 5 SCL Clock Stretching Scheme

Negative Acknowledgement Scheme

R/W = 0 = Write

R/W = 1 = Read

ACK = 0 = Positive Acknowledgement

ACK = 1 = Negative Acknowledgement

Fig. 8

Figure 9  Pre-read Scheme

HDCP DATA TRANSMISSION OVER A SINGLE COMMUNICATION CHANNEL

CROSS-REFERENCE TO RELATED APPLICATION

This application claims the benefit of U.S. Provisional Application No. 60/621,210, entitled "HDCP Data Transmission Over a Communication Channel", filed Oct. 21, 2004, which is incorporated by reference herein in its entirety.

BACKGROUND

1. Field of the Invention

This invention relates in general to high definition television (HDTV) digital video content protected systems, and more particularly to the transmission of High-Bandwidth Digital Content Protection (HDCP) control data over a single communication channel.

2. Background of the Invention

With an advent of high-definition digital video data there is a need to prevent copying and redistribution of the digital content. HDCP specification was developed to protect digital entertainment content across the Digital Video Interface (DVI)/High-Definition Multimedia Interface (HDMI) high-definition digital video delivery systems. The HDCP specification provides a robust, cost-effective and transparent method for transmitting and receiving digital entertainment content to DVI/HDMI-compliant digital displays.

Figure 1:
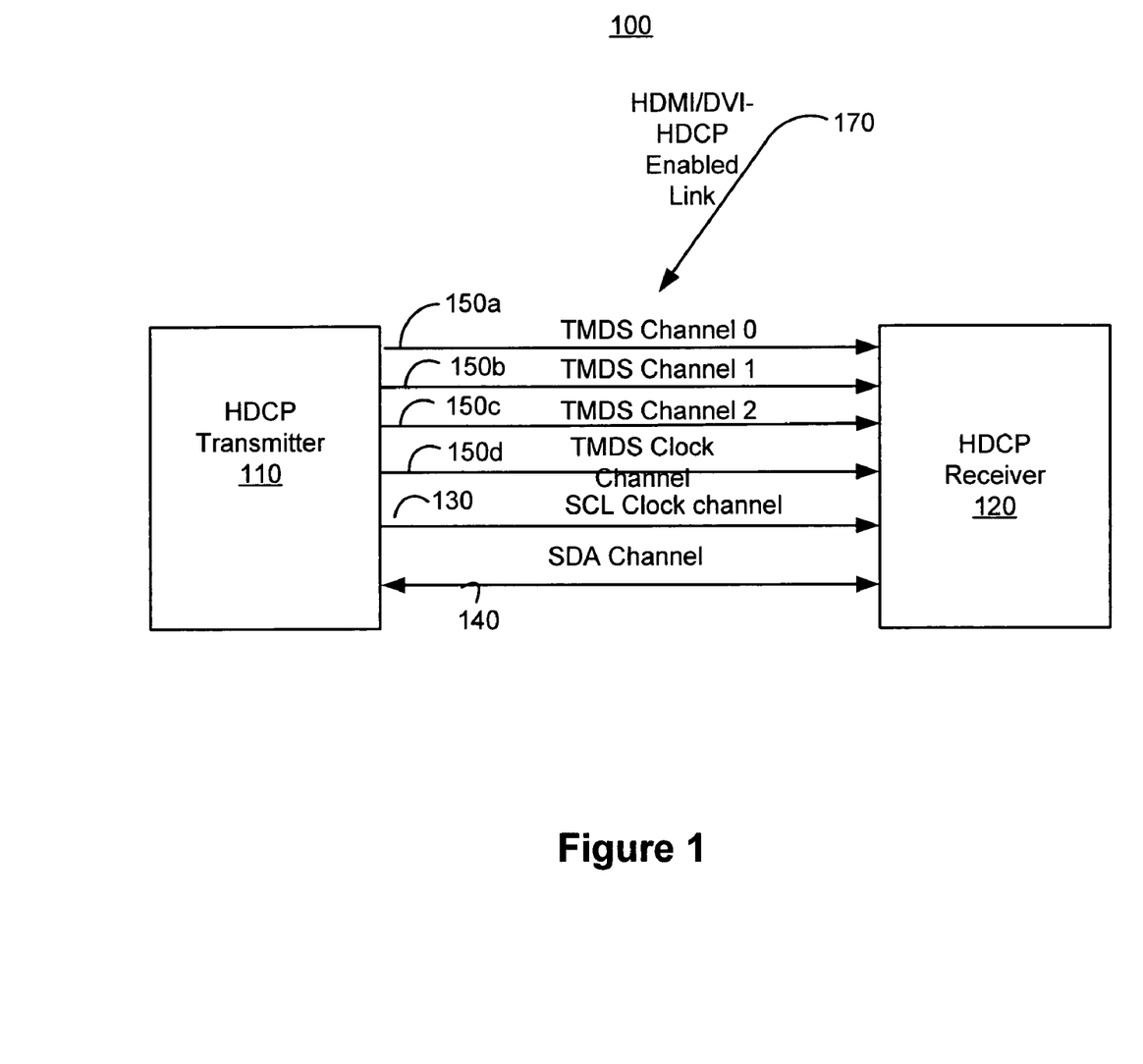
FIG. 1 is a block diagram of a conventional HDCP system for transmitting high definition audio, video and control data.

Referring now to FIG. 1, a conventional HDCP-protected system for transmitting high definition audio and video data is shown. System 100 includes an HDCP transmitter 110 and HDCP receiver 120. The HDCP transmitter 110 is, for example, a High-Definition (HD) capable DVD player, a set-top box, or any other device capable of transmitting HDCP enabled digital content. HDCP receiver 120 is, for example, a HD-capable and HDCP enabled digital display unit, such as a monitor, projector, etc. HDCP transmitter 110 and HDCP receiver 120 are connected via a high speed DVI or HDMI link 170. Link 170 has multiple high-speed differential pairs of transmission lines, such as signal lines 150a, 150b, and 150c that carry high-speed digital video data. Signal lines 150a, 150b, and 150c are Transition Minimized Differential Signaling (TMDS) lines, which carry 24 bits of digital video data. For example, 150a transmits 8 bits that are used for a red channel, 150b transmits 8 bits that are used for a green channel, and 150c transmits 8 bits that are used for a blue channel. Signal line 150d transmits a TMDS clock signal.

Link 170 also has two low-speed signal lines 130 and 140 that are used by the HDCP transmitter 110 and HDCP receiver 120 to exchange HDCP control information. As per the HDCP V1.1 specification developed by Digital Content Protection LLC, all HDCP control data flowing between the HDCP transmitter 110 and HDCP receiver 120 are communicated over the I²C bus serial interface (I2C_V2.1) of the HDCP-protected interface. I²C bus is a two-wire serial bus. The two I²C signals are serial data (SDA) and serial clock (SCL) signals. Signal line 130 is a signal line for transmitting serial clock signal (SCL). Signal line 140 is an SDA bi-directional signal line for transmitting data, such as HDCP related control data and addresses of the HDCP receiving device, between HDCP transmitter 110 and HDCP receiver 120.

All HDCP authorized devices, such as HDCP transmitter 110 and HDCP receiver 120 are given a set of unique secret device keys from the Digital Content Protection LLC. The secret keys consist of an array of forty 56-bit secret device keys and a corresponding 40-bit binary Key Selection Vector (KSV). HDCP transmitter 110 initiates authentication by sending an initiation message that includes its Key Selection Vector, $A_{KSV}$, and a 64-bit value An. HDCP receiver 120 responds by sending a message containing its Key Selection Vector, $B_{KSV}$. HDCP transmitter 110 confirms that the received KSV has not been revoked. At this point, both HDCP transmitter 110 and HDCP receiver 120 calculate a shared value, which will be equal, if both devices 110 and 120 have a set of valid keys. Authentication has now been established.

During initialization and periodically after initialization (approximately every 2 seconds) of the HDCP operation, HDCP transmitter 110 uses the SCL signal line 130 and SDA signal line 140 to exchange HDCP control information with HDCP receiver 120. The HDCP control data includes HDCP receiver 120 capability (Bcaps), the key selection vectors (Aksv and BKsv), 64-bit values An and Bn, and response values R0 and R0'. The HDCP control data enables both HDCP transmitter 110 and HDCP receiver 120 to check each other's authentication status and properly encrypt and decrypt the high-definition digital video and audio data.

When HDCP transmitter 110 initiates an HDCP data read/write operation, it drives SCL signal line 130 as a clock to synchronize the operation between HDCP transmitter 110 and HDCP receiver 120. During each SCL clock period, SDA 140 signal line carries one bit of control data either from HDCP transmitter 110 or from HDCP receiver 120.

With the introduction and advancement of wireless or fiber based digital video delivery systems, it is desirable to carry HDCP control data using a wireless channel or other single communication channel. However, the existing schemes for transferring HDCP control data cannot be used to transmit control data over a single communication channel. First, the existing schemes use two signal lines for transmitting HDCP control data. One signal line carries an SCL clock signal (such as signal line 130 in FIG. 1). The other signal line carries HDCP control data (for example, signal line 140 in FIG. 1). However, in a wireless network or single communication channel network, a single communication channel is not capable of carrying the two signals at the same time.

In addition, in the wired communication media, the wires are bidirectional, and direction of data transfer can be switched during each clock period. However, in a wireless or fiber based network, direction of data could not be switched from one clock period to another. Hence, it is not feasible to carry the HDCP control related data over a wireless communication channel using known techniques.

It is, therefore, desirable to develop a new implementation scheme to handle transmission of HDCP control data over a single communication channel.

SUMMARY OF THE INVENTION

The above need is met by implementation schemes for transmitting HDCP control data between an HDCP transmitter and HDCP receiver over a wireless communication channel or a single wired channel without transmitting a clock signal.

In one embodiment, an HDCP system includes an HDCP transmitter, a wireless transmitter, a wireless receiver, and an HDCP receiver. The HDCP transmitter is coupled to the wireless transmitter via a standard I2C bus. The wireless transmitter is coupled to the wireless receiver over a wireless communication channel. The wireless receiver is coupled to the HDCP receiver via an I2C bus. When the HDCP transmitter issues a write request command, HDCP control data is transmitted from the HDCP transmitter to HDCP receiver over a wireless communication channel. When the HDCP transmitter issues a read request command, HDCP control data is transmitted from the HDCP receiver to HDCP transmitter over the wireless communication channel.

In one embodiment, the present invention uses a clock signal-stretching scheme to accomplish the transfer of HDCP control data over a wireless communication channel. According to this embodiment, an HDCP transmitter issues a read request command to a wireless transmitter. The wireless transmitter receives the read request command and stretches the SCL signal by pulling it low to allow the wireless receiver to have enough time to collect HDCP control data from the HDCP receiver for the read operation. Once all the control data is received, the wireless transmitter releases the clock and provides the requested control data to the HDCP transmitter. By holding the clock signal low for a long period of time, the clock signal-stretching scheme allows the HDCP system to complete a read operation.

In another embodiment, the present invention uses a negative acknowledgement scheme for transmitting HDCP control data over a wireless communication channel. According to the negative acknowledgement scheme, a wireless transmitter sends a negative acknowledgement to an HDCP transmitter in response to a read command request from the HDCP transmitter if the wireless transmitter does not have the control data. In the meantime, the wireless transmitter requests control data from a wireless receiver and HDCP receiver. Once the wireless transmitter receives the requested control data from the HDCP receiver, it provides a positive acknowledgement to the HDCP transmitter in response to a re-try request for the read operation. The wireless transmitter sends the control data to the HDCP transmitter. Using a negative acknowledgement mechanism to transmit HDCP control data in the wireless environment is advantageous because it allows the HDCP system to complete a data read operation.

In yet another embodiment of the present invention, a pre-read scheme is used to accomplish an HDCP read operation. According to this mechanism, a wireless transmitter collects HDCP control data from the HDCP receiver in advance and stores it locally. When the HDCP transmitter issues a read command, the control data is available to be sent to the HDCP transmitter, and hence, there is no delay in transmitting control data to the HDCP transmitter.

Using the above implementation schemes allows an HDCP system to transmit HDCP related control data between an HDCP transmitter and HDCP receiver over a single communication channel.

DETAILED DESCRIPTION OF THE PREFERRED EMBODIMENTS

System Architecture

Figure 2:
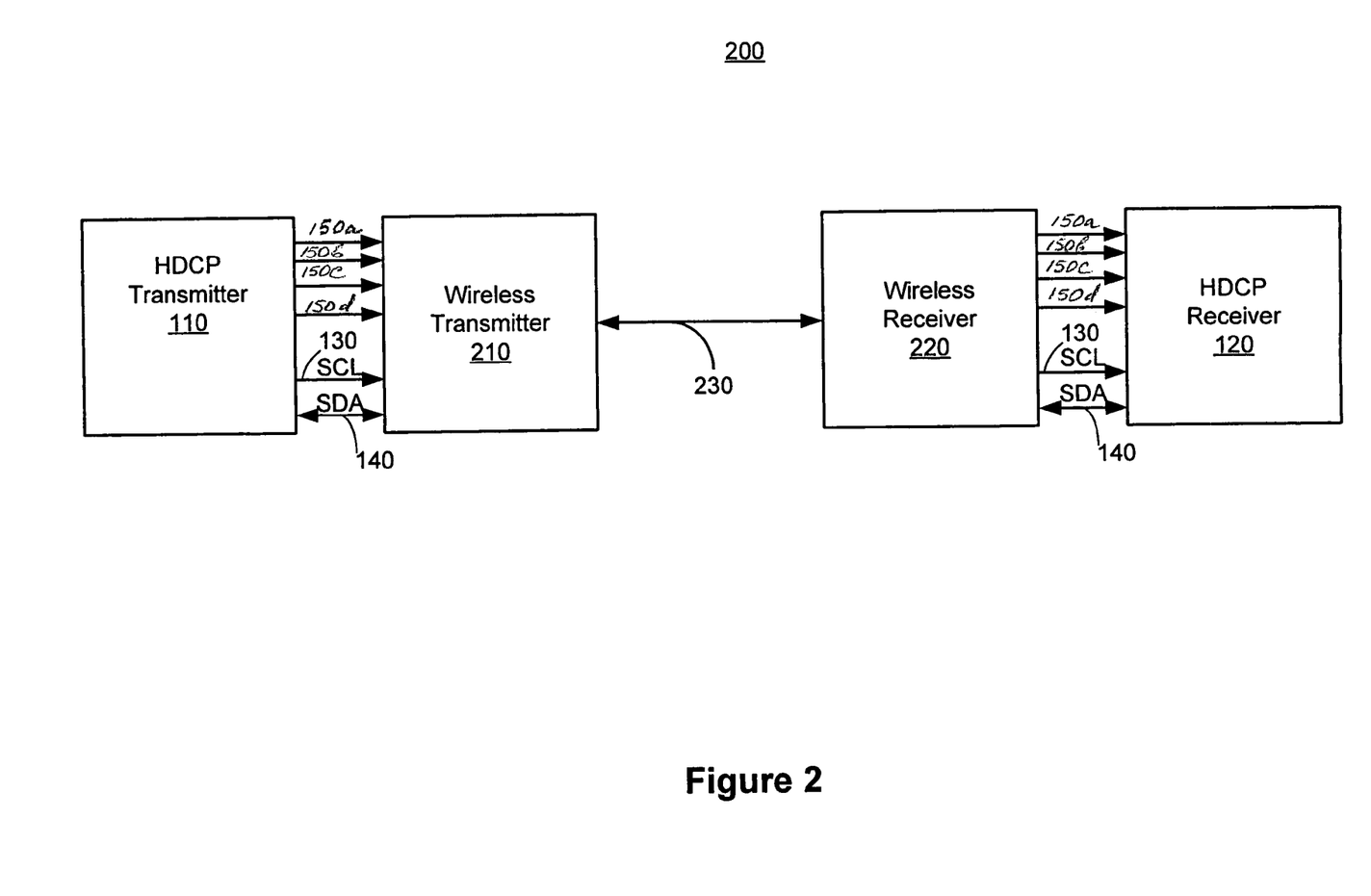
FIG. 2 is a block diagram of a system for transmitting HDCP related control data in a wireless environment.

FIG. 2 is a block diagram of system 200 for transmitting HDCP related control information in a wireless environment according to an embodiment of the present invention. System 200 includes an HDCP transmitter 110, a wireless transmitter 210, an HDCP receiver 120, and a wireless receiver 220. Wireless transmitter 210 and wireless receiver 220 are coupled by a wireless channel 230. Channel 230 is, for example, a single-channel half duplex or full-duplex wireless channel, such as an RF link or IR wireless link.

The wireless transmitter 210 is connected to HDCP transmitter 110 via a standard DVI or HDMI wired bus 170a that includes a plurality of channels. FIG. 2 shows channels 150a-d for transmitting video and audio data and TMDS clock signal; SCL channel 130 for transmitting SCL clock signal; and SDA channel 140 for transmitting HDCP control related data, such as authentication data, device address, etc.

Wireless receiver 220 is similarly connected to HDCP receiver 120 via a standard DVI or HDMI wired bus 170b that includes a plurality of channels. FIG. 2 shows channels 150a-d for transmitting digital video data and a TMDS clock signal; SCL channel 130 for transmitting SCL clock signal; and SDA channel 140 for transmitting control data.

HDCP transmitter 110 is, for example, a High-Definition (HD) capable DVD player, a set-top box, or any device capable of transmitting HDCP enabled digital content. HDCP receiver 120 is, for example, a HD-capable digital display unit.

Wireless transmitter 210 is adapted to receive control data from HDCP transmitter 110, build a data packet that includes the HDCP related addresses and control data, and send the data packet to the wireless receiver 220. The wireless receiver unit 220 preferably receives the data packet over the wireless channel, identifies the HDCP related addresses and control data, and communicates with HDCP receiver 120. The control data includes, for example, one byte for BCAPs, two bytes for Ri, five bytes for Aksv/Bksv, or eight bytes for An, which are transferred in a single data packet.

Methods of Operation

HDCP transmitter 110 is adapted to initiate a transaction request by issuing an HDCP write or read request. When HDCP transmitter 110 issues a write request command, HDCP control data is transmitted from HDCP transmitter to HDCP receiver 120. When HDCP transmitter 110 issues a read request command, HDCP control data is transmitted from HDCP receiver 120 to HDCP transmitter 110.

HDCP Write Operation

Figure 3:
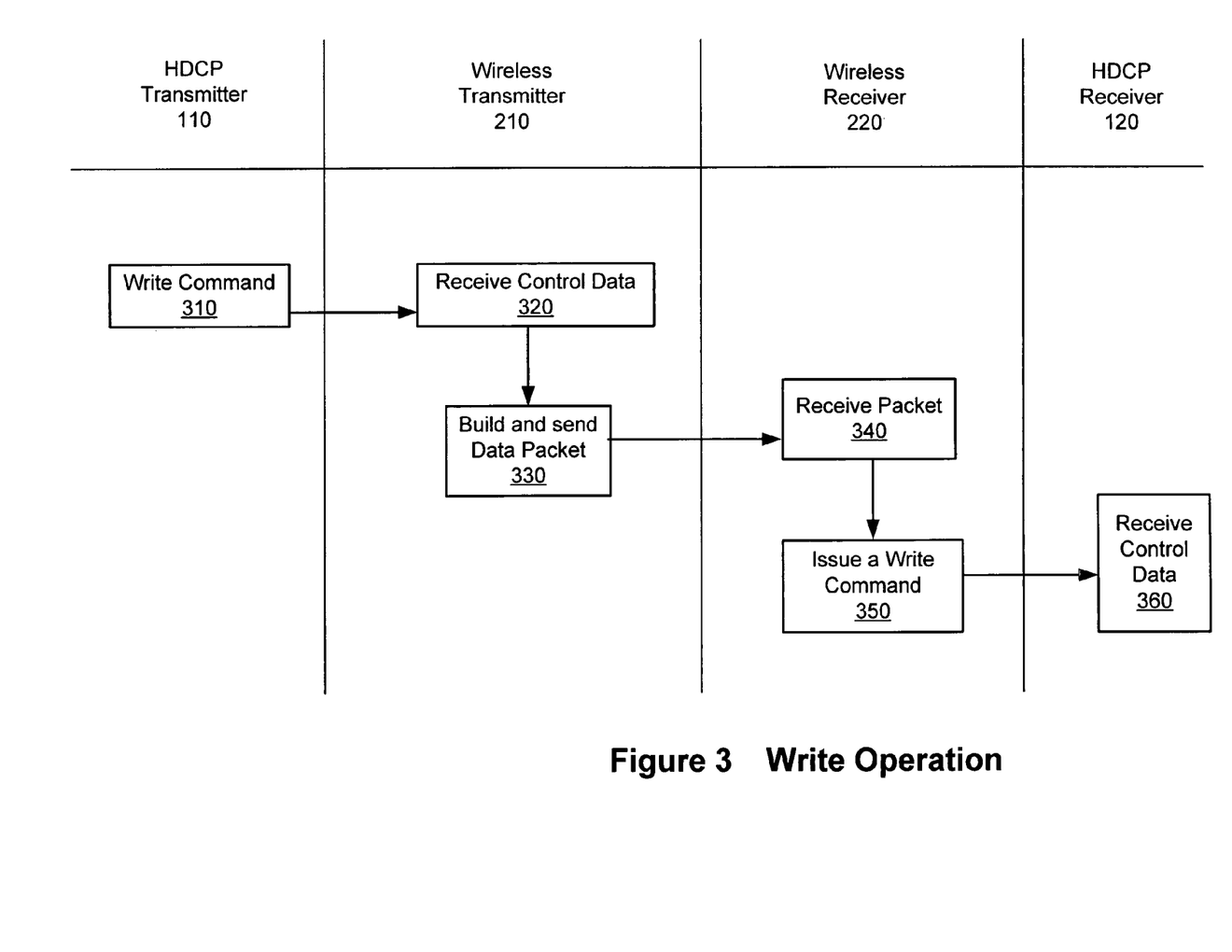
FIG. 3 is an event diagram of the steps performed by HDCP system shown in FIG. 2 to accomplish an HDCP write operation.

FIG. 3 is an event diagram showing the steps performed by various components of system 200 to accomplish an HDCP write operation. Those skilled in the art will recognize that alternative embodiments of the present invention may perform the illustrated steps in different orders, perform additional steps, or even omit certain steps.

Initially, HDCP transmitter 110 issues a write request command 310 to HDCP receiver 120. The write request command includes a device address of HDCP receiver 120 where the control data will be written, a register address (offset address) to which the control data is written in memory of HDCP receiver 120, and control data itself. During each SCL clock period, SDA 140 signal line carries one bit of HDCP control-related data from HDCP transmitter 110.

Wireless transmitter 210 receives 320 the write request, identifies an HDCP receiver's address, offset address, and control data in the request, builds the data packet, and sends 330 the data packet to wireless receiver 220 over wireless communication channel 230. The SCL clock signal is not transmitted over communication channel 230.

Figure 4:
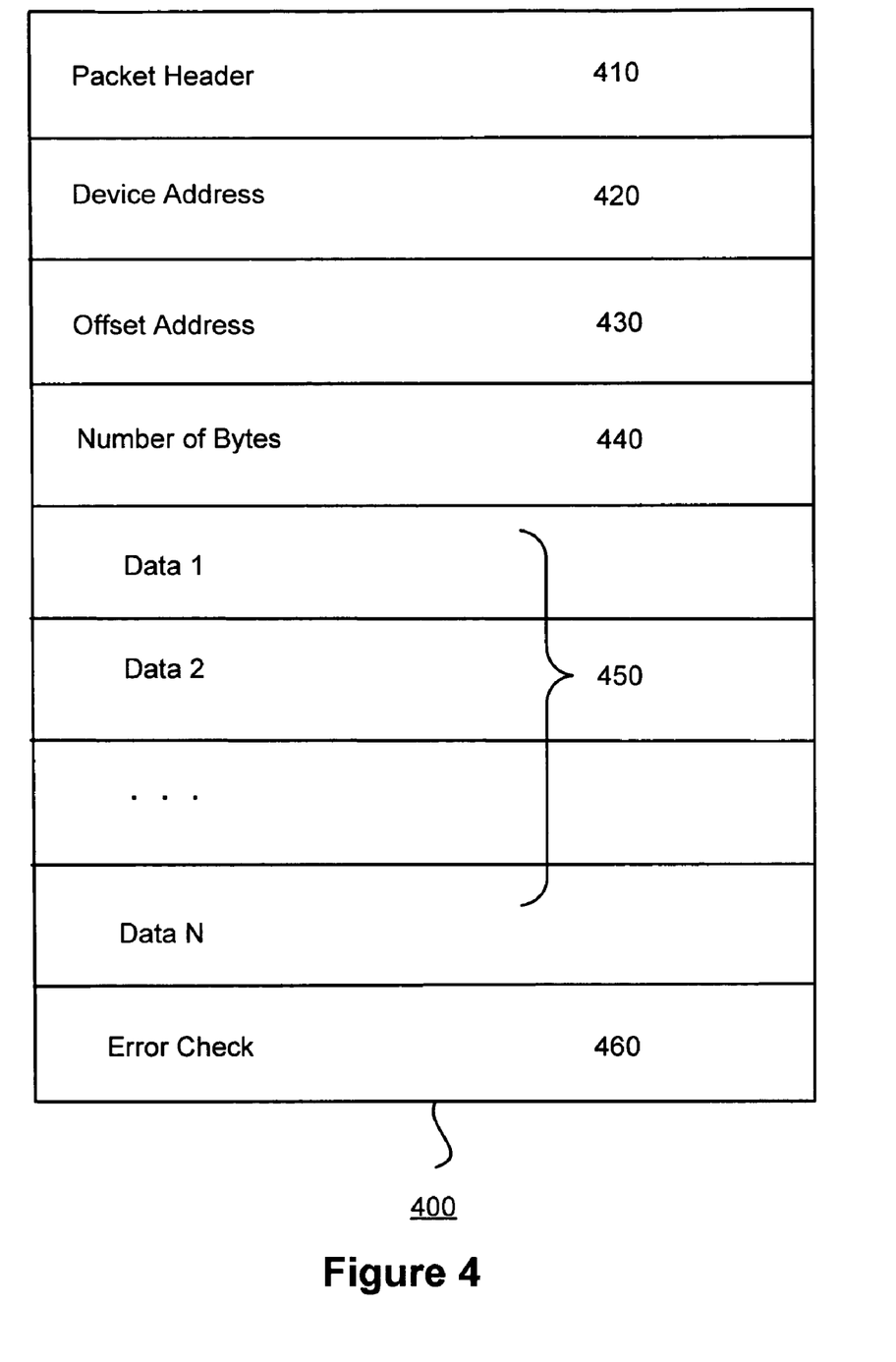
FIG. 4 is a diagram of a format of a write command data packet for transmitting HDCP control data.

FIG. 4 shows an exemplary format of the write request data packet 400 transmitted by wireless transmitter 210 to wireless receiver 220. A person skilled in the art would understand that other data formats could be used to transmit a data packet in HDCP systems. The data packet 400 includes the following fields: a packet header field 410, device address field 420, offset address field 430, number of bytes field 440, data field 450, and error check field 460.

Packet header field 410 carries 7 bits of a data packet sequence number and a read/write bit indicating whether the transaction is a read operation or a write operation. The sequence number starts from zero and is incremented by one for every transmitted data packet.

Device address field 420 is a device address of the HDCP receiver 120. Device address is a fixed address assigned to HDCP devices according to the HDCP specification. For example, for a write operation, address "74H" is used, and for the read operation, "75H" address is used.

Offset address field 430 is the address of the memory register of HDCP receiver 120 to which control data is written.

Number of bytes field 440 carries a number of bytes in the data field 450.

Data field 450 carries control data.

Error check field 460 carries additional byte that is used for error checking purposes.

Referring again to FIG. 3, wireless receiver 220 receives 340 over communication channel 230 the data packet and identifies the control data from the data packet. Wireless receiver 220 uses the address of the HDCP receiver and address of the memory register to issue a write request 350 to HDCP receiver 120. The write request includes the HDCP receiver's address, offset address, and control data.

Wireless receiver 220 regenerates the SCL clock signal as is known in the art. Wireless receiver 220 sends the write request command 350 to HDCP receiver 120 via the I2C bus 170b shown in FIG. 2. In response to the request, the control data is written to the HDCP receiver 120 at the offset address included in the data packet. The write operation is carried out by the SCL clock signal line 130 and SDA data signal line 140 according the I2C specification. During each of the SCL clock period, SDA 140 signal line carries one bit of control data.

If wireless receiver 220 detects an error in the packet, it notifies wireless transmitter 210 and wireless transmitter 210 may resend the data packet.

HDCP Read Operation

In conventional HDCP systems, when control data is transmitted during each clock period between HDCP transmitter 110 and HDCP receiver 120, each SCL clock period can be as short as 2.5 us. When HDCP control data is transmitted over a wireless communication channel, there is not enough time for wireless transmitter 210 to collect data from the HDCP receiver 120 and provide control data to HDCP transmitter 110 during one clock period. To address this problem, the present invention offers the following implementation techniques to accomplish an HDCP read operation: a clock signal stretching scheme, a negative acknowledgement scheme, and a pre-read scheme.

A. Clock Signal Stretching Scheme

Figure 5:
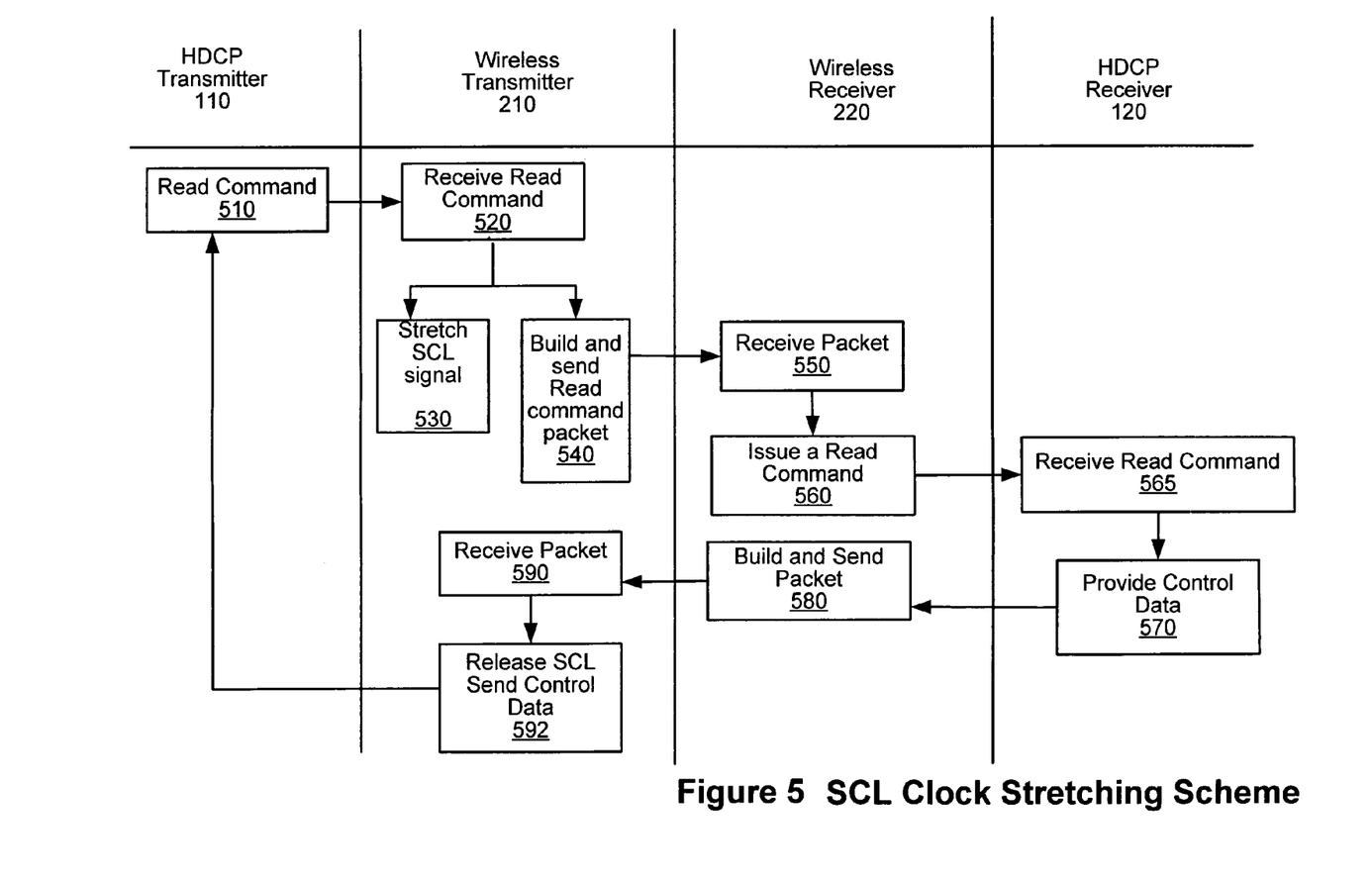
FIG. 5 is an event diagram of the steps performed by HDCP system shown in FIG. 2 to accomplish an HDCP read operation using a clock signal-stretching scheme.

Generally, HDCP transmitter 110 transmits data over SDA signal line 140 by setting SCL signal from high to low and to high again for every bit of data transfer. Any device connected to an I²C bus can stretch the low period to extend the read or write operation. According to this embodiment of the present invention, wireless transmitter 210 stretches the SCL signal by pulling it low 530 after the wireless transmitter 210 receives all the necessary addresses for the read operation. While it holds the SCL low to extend the time for transmitting HDCP control related data, wireless transmitter 210 builds a wireless data packet and sends it to wireless receiver 220. Upon receiving the packet, wireless receiver 220 requests HDCP control data from HDCP receiver 120 and sends it back to wireless transmitter 210. After receiving the HDCP control data from wireless receiver 210, wireless transmitter 210 releases the SCL clock signal and sends the HDCP data to HDCP transmitter 110. Afterwards, HDCP transmitter 110 finishes the current read operation.

FIG. 5 is an event diagram illustrating the steps performed by system 200 to accomplish an HDCP read operation using a clock signal-stretching scheme. Those skilled in the art will recognize that alternative embodiments of the present invention may perform the illustrated steps in different orders, perform additional steps, or even omit certain steps.

Initially, HDCP transmitter 110 issues a read request command 510 to wireless transmitter 210. The read request command includes the address of HDCP receiver 120 from which control data is requested as well as an offset address.

Wireless transmitter 210 receives 520 the read command and performs the following two operations: 1) pulls SCL clock signal low to extend the time for completing a read operation and 2) builds 540 a read command data packet and sends the packet to the wireless receiver 220.

Figure 6:
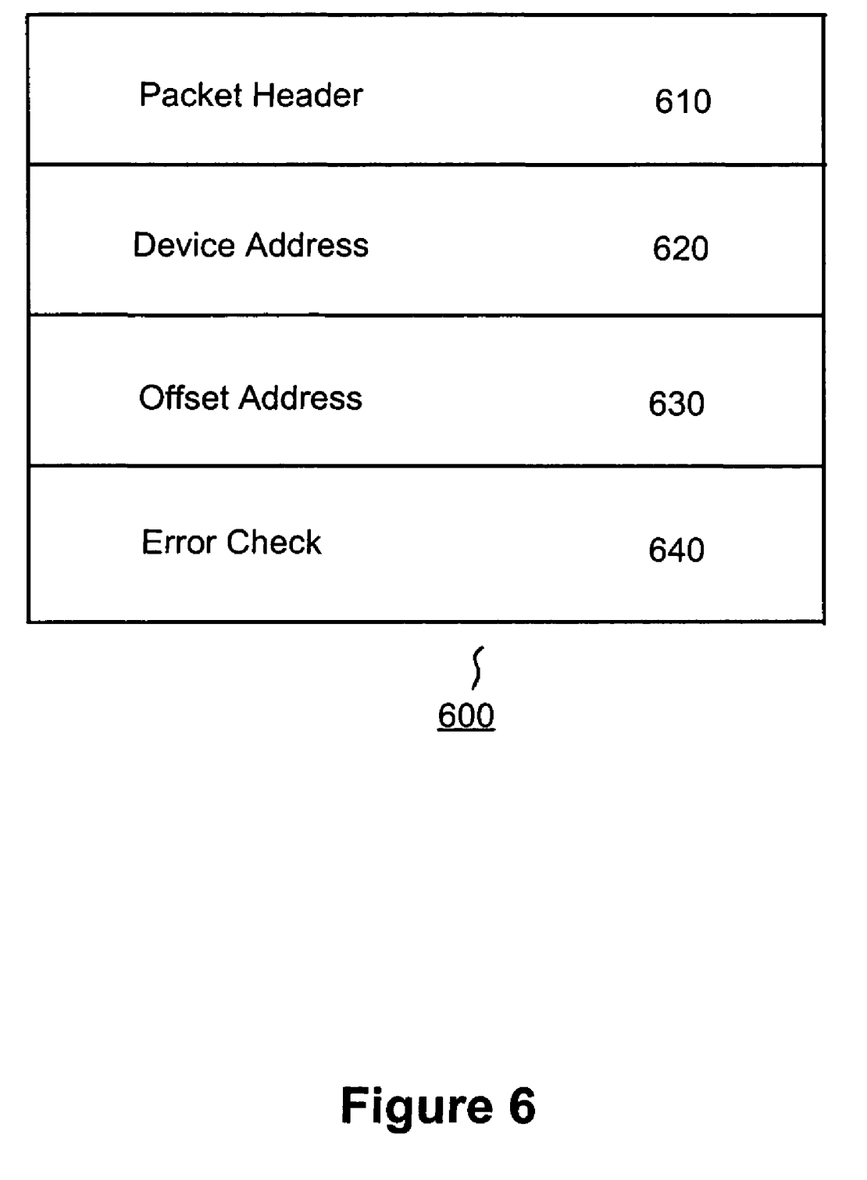
FIG. 6 is a diagram of a read command data packet for transmitting HDCP control data.

FIG. 6 illustrates an exemplary format of the read command data packet 600. A person skilled in the art would understand that other data formats could be used to transmit a data packet in HDCP systems. The read command data packet includes the following fields: a packet header field 610, device address field 620, offset address field 630, and error check field 640.

Packet header field 610 carries 7 bits of a data packet sequence number and a read/write bit indicating whether the transaction is a read operation or a write operation. The sequence number starts from zero and is incremented by one for every transmitted packet. Packet header field 610 is a one-byte field.

Device Address field 620 indicates HDCP receiver's 120 device address. This is a fixed address that is assigned according to the HDCP specification. For example, for the read operation, address "75H" is used.

Offset Address field 630 is the address of the register in the memory of HDCP receiver 120 from which control data is read.

Error Check field 640 is an additional byte that is used for error checking purpose.

Referring again to FIG. 5, wireless receiver 220 receives 550 the data packet and issues 560 a read command to HDCP receiver 120. The read command includes a device address of an HDCP receiver and offset address in memory in the HDCP receiver.

HDCP receiver 120 receives the read command 565 and provides 570 to wireless receiver 220 HDCP control data stored at the offset address indicated in the data packet. During each SCL clock period, SDA 140 signal line carries one bit of addresses or control data between wireless receiver 220 and HDCP receiver 120.

Wireless receiver 220 receives the HDCP control data, builds 580 a data packet that includes all the HDCP control data, and sends the data packet to wireless transmitter 210 without sending an SCL clock signal. The data packet sent from receiver 220 to transmitter 210 has a format similar to the data packet format shown in FIG. 4.

Once wireless transmitter 210 receives 590 the data packet and identifies the HDCP control data in the packet, it sends the control data to HDCP transmitter 110 on SDA signal line 140 and releases 592 the SCL clock signal to allow the current HDCP read operation to complete.

Thus, the clock signal-stretching scheme advantageously allows system 200 to complete the read operation by holding the SCL clock signal low for a longer period of time. This time period allows wireless transmitter 210 to collect HDCP control data from HDCP receiver 120.

B. Negative Acknowledgement Scheme

Figure 7:
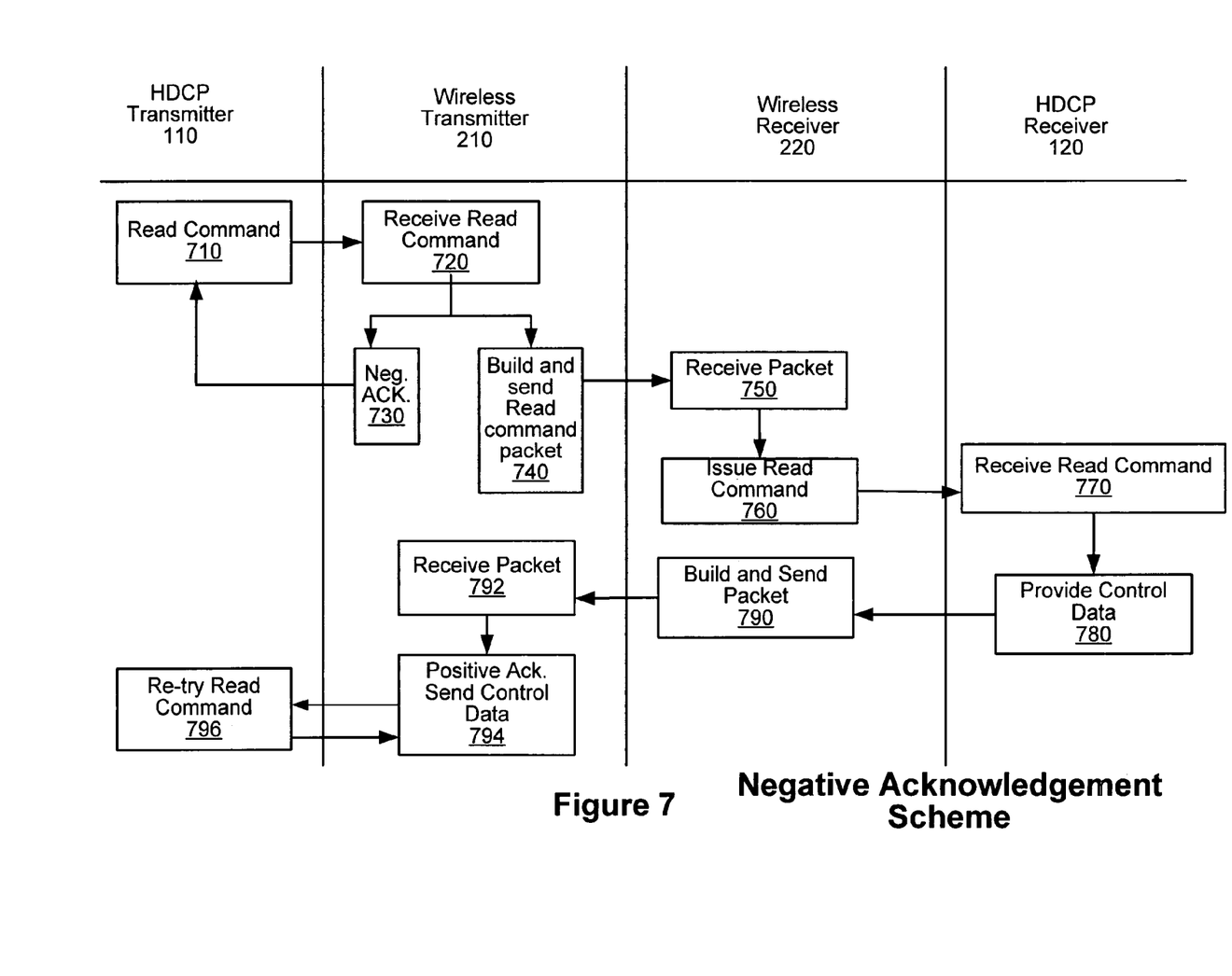
FIG. 7 is an event diagram of the steps performed by HDCP system shown in FIG. 2 to accomplish an HDCP read operation using a negative acknowledgement scheme.

According to the negative acknowledgement scheme, wireless transmitter 210 sends a negative acknowledgement to HDCP transmitter 110 in response to a read command request from the HDCP transmitter 110 if the wireless transmitter 110 does not have the control data. Upon detecting a negative acknowledgement, the HDCP transmitter 110 re-tries the same command to finish the operation. In the meantime, the wireless transmitter 210 requests control data from a wireless receiver 220 and HDCP receiver 120. Once the wireless transmitter 210 receives the requested control data from the HDCP receiver 120, it provides a positive acknowledgement to the HDCP transmitter 110 in response to a re-try request for the read operation. The wireless transmitter 210 sends the control data to the HDCP transmitter 110. Using a negative acknowledgement mechanism to transmit HDCP control data in the wireless environment is advantageous because it allows the HDCP system to complete a data read operation.

Referring now to FIG. 7, an event diagram illustrating the steps performed by system 200 to accomplish an HDCP read operation using a negative acknowledgement scheme is shown. Those skilled in the art will recognize that alternative embodiments of the present invention may perform the illustrated steps in different orders, perform additional steps, or even omit certain steps.

Initially, HDCP transmitter 110 issues 710 a read request command to wireless transmitter 210. The read request command includes a device address and offset address of HDCP receiver 120 that stores control data requested by HDCP transmitter 110. If wireless transmitter 210 does not have the requested data, wireless transmitter 210 sends 730 a negative acknowledgement to HDCP transmitter 110. In the meantime, wireless transmitter 210 sends 740 the read request command packet to wireless receiver 220. The read request command packet has a format similar to the one illustrated in FIG. 6. Wireless receiver 220 receives 750 the read command data packet and issues 760 a read command to HDCP receiver 120. The read command includes HDCP-related addresses.

After reading the HDCP control data from HDCP receiver 120, wireless receiver 220 builds 780 a data packet that includes HDCP controls data and sends the data packet to wireless transmitter 210.

Once HDCP transmitter 110 detects the negative acknowledgement condition, HDCP transmitter 110 re-tries 796 a read request to wireless transmitter 210. The read request includes the same device address and offset address that was included in the previous read request to which the response was not received. Once wireless transmitter 210 receives the data packet from the wireless receiver 220, wireless transmitter 210 sends a positive acknowledgement 794 to HDCP transmitter 110 along with the requested HDCP control data.

Figure 8:
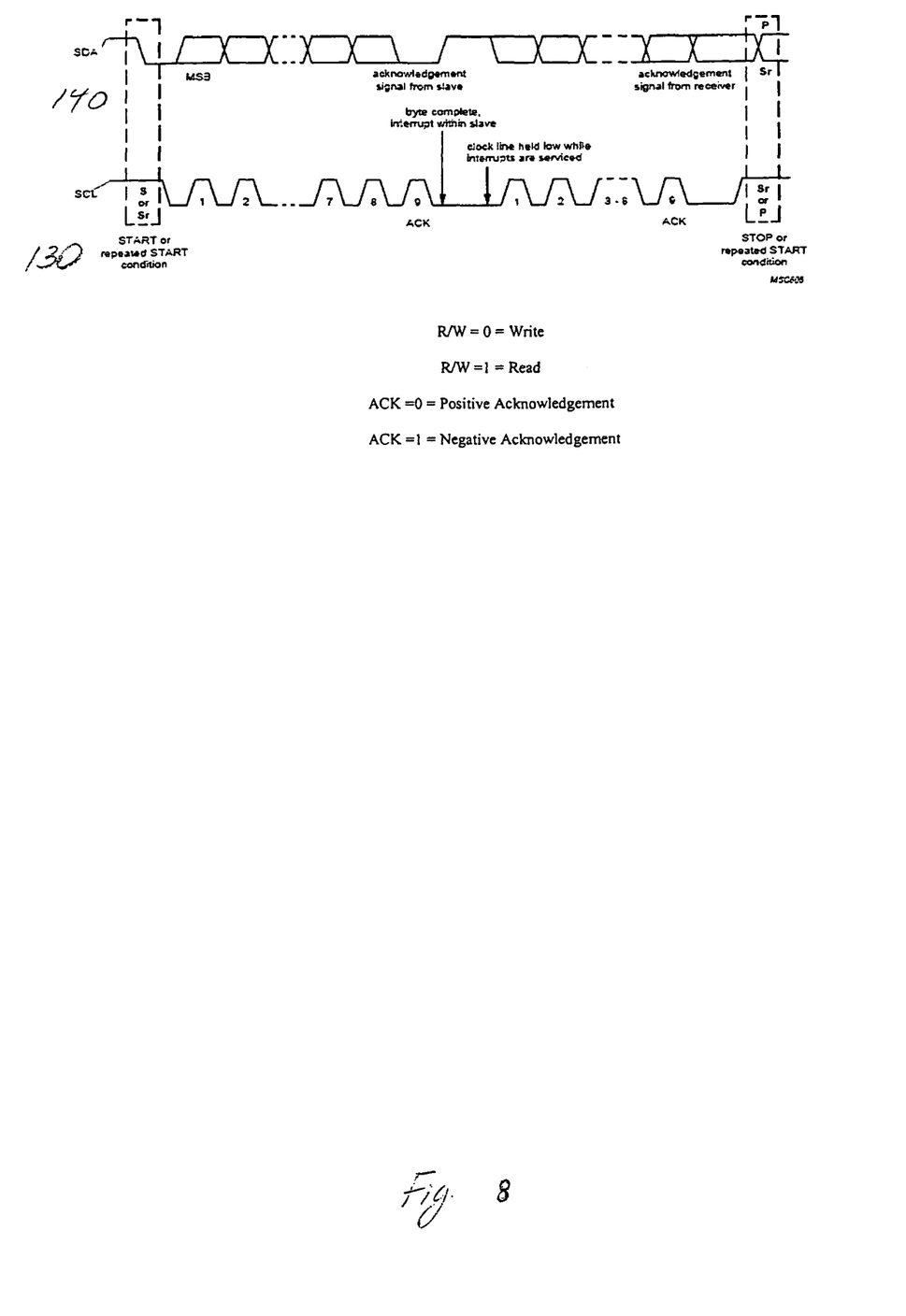
FIG. 8 is a timing diagram of the HDCP read operation using a negative acknowledgement scheme.

FIG. 8 is a timing diagram illustrating a negative acknowledgement implementation scheme. FIG. 8 shows an I2C bus 170a such as the one that connects HDCP transmitter 110 and wireless transmitter 210 shown in FIG. 2. Bus 170a includes an SCL clock signal line 130 for transmitting a clock signal and SDA signal line 140 for transmitting HDCP control data. For every SCL clock period, SDA signal line 140 transmits one bit of control data and HDCP-related addresses either from HDCP transmitter 110 or from HDCP receiver 120. A cycle for transmission of HDCP control data includes a "start" position indicating the beginning of the data read, a "repeated start" position indicating the repeated start of the data read operation, and "stop" position indicating the end of the data transfer.

SCL signal line 130 illustrates clock periods for transmitting control data on SDA signal line 140. In one implementation, a data read operation requires eight clock periods to transmit 8 bits of control data. One bit of control data is transmitted during each SCL clock period. HDCP transmitter 110 begins data transmission by issuing a start condition. Then HDCP transmitter 110 transmits a byte of control data with the most significant bit (MSB) first. At the end of the byte, a receiving device issues an acknowledgement (Ack) bit. This 9-bit pattern is repeated if more bytes need to be transmitted. In one implementation, when an acknowledgement bit is "1", wireless transmitter 210 sends a negative acknowledgement to HDCP transmitter 110. When an acknowledgement bit is "0", wireless transmitter 210 sends a positive acknowledgement to HDCP transmitter 110.

When HDCP transmitter 110 initiates a write operation, it places on SDA signal line 140 for each clock period one bit of HDCP control data, address of HDCP receiver 120 and offset address to which the control data will be written. HDCP transmitter 110 receives acknowledgement from wireless transmitter 210 every $9^{th}$ clock period.

When HDCP transmitter 110 initiates a read operation, it places on SDA signal line 140 HDCP receiver's address and offset address during clock periods 1 through 8. Wireless transmitter 210 sends an acknowledgement to HDCP transmitter 110 every $9^{th}$ clock period for one byte address transfer. After the address transfer is finished, wireless transmitter 210 sends a data bit for each SCL clock during clock period 1 through 8. HDCP transmitter sets an acknowledgment bit for every $9^{th}$ clock period.

C. Pre-Read Scheme

Figure 9:
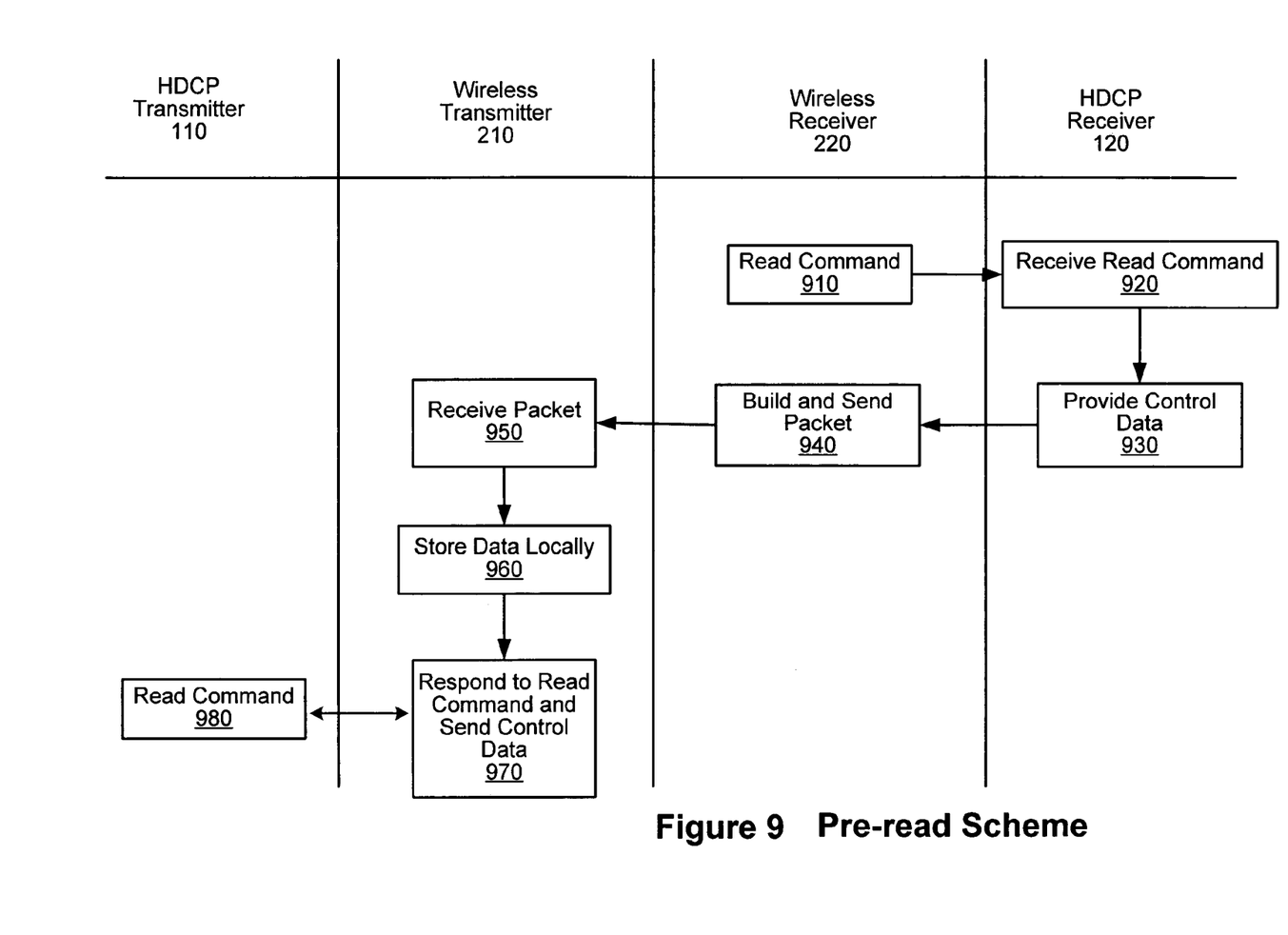
FIG. 9 is an event diagram of the steps performed by HDCP system shown in FIG. 2 to accomplish an HDCP read operation using a pre-read scheme.

According to the pre-read scheme, wireless transmitter 210 stores locally HDCP control data. When HDCP transmitter 110 issues a read command, the control data is available to be sent to the HDCP transmitter 110, and hence, there is no delay in transmitting control data to the HDCP transmitter.

FIG. 9 is an event diagram illustrating the steps performed by system 200 to accomplish an HDCP read operation using a pre-read scheme. In a pre-read implementation scheme, wireless receiver 220 issues a read command to HDCP receiver before HDCP transmitter 110 issues its HDCP read request. The read command includes an HDCP receiver's address and offset address. HDCP receiver 120 receives 920 the read command and provides 930 control data at the address indicated in the read command to wireless receiver 220.

Wireless receiver 220 receives the control data and builds 940 a data packet that includes the control data, such as Bcap, Bksv, R0, and Ri. Wireless receiver 220 sends 940 the data packet to wireless transmitter 210. The transmitted data packet has a format similar to the one illustrated in FIG. 4. Wireless transmitter 210 receives 950 the data packet and stores 960 the data packet locally.

HDCP transmitter 110 issues 980 a read request to wireless transmitter 210. The read request includes an address of HDCP receiver and an offset address. In response to the request, wireless transmitter 210 sends its locally-stored control data to HDCP transmitter 110 over I2C bus 170a. Since Ri values periodically change, in one embodiment, wireless receiver 220 issues an HDCP read command 480 for Ri to periodically update the data stored by wireless transmitter 210. The interval for updating Ri values can be one millisecond or less. This assures that HDCP transmitter 110 always receives the most recently updated Ri from HDCP receiver 120.

An advantage of the pre-read implementation scheme in that HDCP wireless transmitter 210 stores control data locally. When HDCP transmitter 110 issues a read command, the control data is available, and hence there is no delay in transmitting control data to HDCP transmitter 110.

Although the present invention is discussed with respect to the transmission of HDCP control data in a wireless communication system, the implementation schemes for transmitting HDCP control data are applicable to any HDCP single channel wired system having a wired link, such as an optical fiber link or a copper wired link. In such an implementation, a single wired link is used to carry control data instead of the wireless link. All of the aforementioned schemes are applicable to implement transmission of HDCP related control data over a wired communication link.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by hardware component and/or computer programs. Furthermore, it has also proven convenient at times, to refer to these arrangements of operations as modules or by functional names, without loss of generality.

Certain aspects of the present invention include process steps and instructions described herein in the form of an algorithm or description. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter.

We claim:

1. A method for transmitting control data between a high-bandwidth digital content protection (HDCP) transmitting device and an HDCP receiving device via a transmitter and a receiver configured to communicate with each other over a single, duplex communication channel, the method comprising:

the transmitter receiving from the HDCP transmitting device a read transaction request for HDCP control data via a first serial bus including at least a first signal line dedicated for transmitting a clock signal and a second signal line for transmitting the HDCP control data;

responsive to the transmitter not having received the requested HDCP control data, the transmitter sending a negative acknowledgement signal to the HDCP transmitting device via the first serial bus;

the transmitter receiving the requested HDCP control data from the HDCP receiving device via the receiver, the receiver receiving the requested HDCP control data from the HDCP receiving device via a second serial bus including at least a third signal line dedicated for transmitting the clock signal and a fourth signal line for transmitting the HDCP control data, and the transmitter receiving the requested HDCP control data from the receiver without the clock signal over the single, duplex communication channel, wherein the single, duplex communication channel does not have a dedicated clock signal line and is not capable of carrying the clock signal and the HDCP control data at the same time;

the transmitter receiving from the HDCP transmitting device a retry read request for the HDCP control data via the first serial bus; and the transmitter providing the HDCP control data to the HDCP transmitting device via the first serial bus.

2. The method of claim 1, wherein the step of the transmitter receiving from the HDCP receiving device the requested HDCP control data further comprises the transmitter receiving a data packet that includes the HDCP control data.

3. The method of claim 2, further comprising identifying the HDCP control data from the data packet.

4. The method of claim 2, further comprising the transmitter sending a positive acknowledgement signal to the HDCP transmitting device responsive to the transmitter having received the data packet that includes the requested HDCP control data.

5. The method of claim 2, wherein the single, duplex communication channel is an optical fiber link.

6. The method of claim 2, wherein the single, duplex communication channel is a wireless link.

7. A method for transmitting control data between a high-bandwidth digital content protection (HDCP) transmitting device and an HDCP receiving device via a transmitter and a receiver configured to communicate with each other over a single, duplex communication channel, the method comprising:

the transmitter receiving from the HDCP transmitting device a read transaction request for HDCP control data and a clock signal via a first serial bus including at least a first signal line dedicated for transmitting the clock signal and a second signal line for transmitting the HDCP control data, the read transaction request including an address of the HDCP receiving device;

the transmitter sending to the receiver over the single, duplex communication channel the read transaction request for the HDCP control data;

the transmitter stretching the clock signal until the requested HDCP control data is received by the transmitter;

the transmitter receiving from the receiver over the single, duplex communication channel the requested HDCP control data without the clock signal, wherein the single, duplex communication channel does not have a dedicated clock signal line and is not capable of carrying the clock signal and the HDCP control data at the same time;

the transmitter releasing the clock signal; and the transmitter providing to the HDCP transmitting device the HDCP control data via the first serial bus in response to the read transaction request.

8. The method of claim 7, wherein stretching the clock signal further comprises preventing the clock signal from transitioning from a low state to a high state.

9. A method for transmitting control data between a high-bandwidth digital content protection (HDCP) transmitting device and an HDCP receiving device via a transmitter and a receiver configured to communicate with each other over a single, duplex communication channel, the method comprising:

the receiver issuing a read command request for HDCP control data to the HDCP receiving device via a first serial bus including at least a first signal line dedicated for transmitting a clock signal and a second signal line for transmitting the HDCP control data, the request including an address of the HDCP receiving device;

the receiver receiving the requested HDCP control data from the HDCP receiving device via the first serial bus;

the receiver providing the received HDCP control data over the single, duplex communication channel to the transmitter without the clock signal, wherein the single, duplex communication channel does not have a dedicated clock signal line and is not capable of carrying the clock signal and the HDCP control data at the same time;

the transmitter receiving from the HDCP transmitting device a read transaction request for the HDCP control data via a second serial bus including at least a third signal line dedicated for transmitting the clock signal and a fourth signal line for transmitting the HDCP control data; and the transmitter providing the previously received HDCP control data to the HDCP transmitting device via the second serial bus.

10. A communication device for facilitating the transmission of control data between a high-bandwidth digital content protection (HDCP) transmitting device and an HDCP receiving device over a single, duplex communication channel, the communication device comprising:

a transmitter adapted to:

receive from the HDCP transmitting device a read transaction request for HDCP control data and a clock signal via a first serial bus including at least a first signal line dedicated for transmitting the clock signal and a second signal line for transmitting the HDCP control data, the request including an address of the HDCP receiving device, stretch the clock signal until the requested HDCP control data is received at the transmitter, receive from a receiver over the single, duplex communication channel the requested HDCP control data without the clock signal, wherein the single, duplex communication channel does not have a dedicated clock signal line and is not capable of carrying the clock signal and the HDCP control data at the same time, release the clock signal, and provide the HDCP control data to the HDCP transmitting device via the first serial bus; and the receiver adapted to receive the HDCP control data from the HDCP receiving device via a second serial bus including at least a third signal line dedicated for transmitting the clock signal and a fourth signal line for transmitting the HDCP control data and to provide the received HDCP control data to the transmitter without the clock signal over the single, duplex communication channel.

11. The communication device of claim 10, wherein the transmitter stretches the clock signal by preventing the clock signal from transitioning from a low state to a high state.

12. A communication device for facilitating the transmission of control data between a high-bandwidth digital content protection (HDCP) transmitting device and an HDCP receiving device over a single, duplex communication channel, the communication device comprising:

a transmitter adapted to:

receive from the HDCP transmitting device a read transaction request for HDCP control data via a first serial bus including at least a first signal line dedicated for transmitting a clock signal and a second signal line for transmitting the HDCP control data, send a negative acknowledgment signal to the HDCP transmitting device via the first serial bus, responsive to the transmitter not having received the requested HDCP control data, receive from the HDCP transmitting device a retry read request for the HDCP control data via the first serial bus, and provide the HDCP control data to the HDCP transmitting device via the first serial bus after having received the requested HDCP control data without the clock signal from a receiver over the single, duplex communication channel, wherein the single, duplex communication channel does not have a dedicated clock signal line and is not capable of carrying the clock signal and the HDCP control data at the same time; and the receiver adapted to receive the HDCP control data from the HDCP receiving device via a second serial bus including at least a third signal line dedicated for transmitting the clock signal and a fourth signal line for transmitting the HDCP control data and to provide the HDCP control data to the transmitter without the clock signal over the signal, duplex communication channel.

13. A communication device for facilitating the transmission of control data between a high-bandwidth digital content protection (HDCP) transmitting device and an HDCP receiving device over a single, duplex communication channel, the communication device comprising:

a first communication device adapted to perform the steps of:

issuing, to the HDCP receiving device, a read command request for HDCP control data, via a first serial bus including at least a first signal line dedicated for transmitting a clock signal and a second signal line for transmitting the HDCP control data, receiving the requested HDCP control data via the first serial bus, and providing the received HDCP control data without the clock signal over the single, duplex communication channel to a second communication device; and the second communication device adapted to perform the steps of:

receiving the HDCP control data without the clock signal from the first communication device over the single, duplex communication channel, wherein the single, duplex communication channel does not have a dedicated clock signal line and is not capable of carrying the clock signal and the HDCP control data at the same time, receiving, from the HDCP transmitting device, a read transaction request for the HDCP control data via a second serial bus including at least a third signal line dedicated for transmitting the clock signal and a fourth signal line for transmitting the HDCP control data, and providing the previously received HDCP control data to the HDCP transmitting device via the second serial bus.

14. A method for facilitating the transmission of control data between a high-bandwidth digital content protection (HDCP) transmitting device and an HDCP receiving device via a first communication device and a second communication device configured to communicate with each other over a single, duplex communication channel, the method comprising:

the first communication device receiving from the HDCP transmitting device a write transaction request via a first serial bus including at least a first signal line dedicated for transmitting a clock signal and a second signal line for transmitting the HDCP control data, the request including an address of the HDCP receiving device;

the first communication device building a data packet that includes HDCP control data;

the first communication device sending the data packet without the clock signal over the single, duplex communication channel to the second communication device, wherein the single, duplex communication channel does not have a dedicated clock signal line and is not capable of carrying the clock signal and the HDCP control data at the same time;

the second communication device receiving the data packet; and the second communication device issuing a write command to the HDCP receiving device via a second serial bus including at least a third signal line dedicated for transmitting the clock signal and a fourth signal line for transmitting the HDCP control data, the write command including the HDCP control data.

15. The method of claim 14, wherein the single, duplex communication channel is an optical fiber link.

16. The method of claim 14, wherein the single, duplex communication channel is a wireless link.

17. The method of claim 14, wherein the first communication device is a wireless transmitting device.

18. The method of claim 14, wherein the second communication device is a wireless receiving device.

* * * * *